United States Patent
Ryan

(10) Patent No.: US 8,220,559 B2
(45) Date of Patent: Jul. 17, 2012

(54) PLOUGH ASSEMBLY FOR DEEP SOIL CULTIVATION

(75) Inventor: John William Ryan, Jandakot (AU)

(73) Assignee: Ausplow Pty. Ltd., Jandakot, Western Australia (AU)

( * ) Notice: Subject to any disclaimer, the term of this patent is extended or adjusted under 35 U.S.C. 154(b) by 0 days.

(21) Appl. No.: 11/775,654

(22) Filed: Jul. 10, 2007

(65) Prior Publication Data

US 2009/0014191 A1 Jan. 15, 2009

(51) Int. Cl.
*A01B 49/06* (2006.01)

(52) U.S. Cl. ........ 172/196; 172/145; 172/146; 172/176; 111/111; 111/120; 111/148; 111/186

(58) Field of Classification Search ............. 111/104, 111/107, 111, 120, 125, 126, 140, 147, 148, 111/149, 150, 109, 162, 170, 190, 194, 134, 111/191, 186, 136; 172/139, 144, 145, 146, 172/149, 150, 165, 170, 174, 175, 176, 195, 172/196

See application file for complete search history.

(56) References Cited

U.S. PATENT DOCUMENTS

| | | | | |
|---|---|---|---|---|
| 2,357,760 A | * | 9/1944 | Peacock | 111/194 |
| 3,307,508 A | * | 3/1967 | Russell | 111/149 |
| 4,520,742 A | * | 6/1985 | Anderson | 111/155 |
| 4,798,151 A | * | 1/1989 | Rodrigues et al. | 111/73 |
| 5,331,907 A | * | 7/1994 | Beaujot | 111/52 |
| 5,396,851 A | * | 3/1995 | Beaujot | 111/187 |
| 5,417,293 A | * | 5/1995 | Leader | 172/721 |
| 5,562,054 A | * | 10/1996 | Ryan | 111/134 |
| 5,579,852 A | * | 12/1996 | Woodward et al. | 172/721 |
| 5,906,166 A | * | 5/1999 | Wagner | 111/170 |
| 6,142,085 A | * | 11/2000 | Drever et al. | 111/151 |
| 6,945,182 B1 | * | 9/2005 | Haukaas et al. | 111/60 |
| 6,955,131 B2 | * | 10/2005 | Beaujot et al. | 111/187 |
| 7,104,205 B2 | * | 9/2006 | Beaujot | 111/141 |
| 2004/0211346 A1 | * | 10/2004 | Beaujot et al. | 111/170 |

FOREIGN PATENT DOCUMENTS

| | | |
|---|---|---|
| AU | 541415 A1 | 1/1985 |
| AU | 675376 A1 | 8/1995 |

* cited by examiner

*Primary Examiner* — Thomas Will
*Assistant Examiner* — Matthew D Troutman
(74) *Attorney, Agent, or Firm* — Fitch, Even, Tabin & Flannery, LLP

(57) ABSTRACT

A plough assembly (10) to be fixed to a plough frame including a transverse beam (11). The assembly (10) includes a plough shank (13) with a leading surface (14) that is generally upwardly oriented. The lower end of the shank (13) is provided with a digging adapter (24) to which there is attached a digging blade (28). Located behind the adapter (24) is a fertilizer delivery tube (33), while behind the tube (33) is a seed delivery tube (42). A seed bed is formed by a tool (43) that is in front of the tube (42), while behind the tube (42) is a press wheel (39).

27 Claims, 2 Drawing Sheets

PLOUGH ASSEMBLY FOR DEEP SOIL CULTIVATION

TECHNICAL FIELD

The present invention relates to plough assemblies to be attached to a plough frame to be drawn through a soil layer to work the soil and to plant seed therein.

BACKGROUND OF THE INVENTION

Described in Australian Patent 675376US is a plough assembly that includes a plough shank to the lower end of which there is fixed a digging blade. Behind the shank and blade is a closing tool that forms a seed bed upon which seed is deposited. Soil is moved to cover the seed by a press wheel. This assembly is a development of the assembly described in Australian Patent 541415.

Previously known ploughs have suffered from the disadvantage of not accurately locating the seed relative to the soil surface and not having provided the most efficient distribution of fertilizer to be used by seed deposited in the soil layer.

OBJECT OF THE INVENTION

It is the object of the present invention to overcome or at least substantially ameliorate at least one of the above disadvantages.

SUMMARY OF THE INVENTION

There is disclosed herein a plough assembly to be mounted on a beam to be moved in a longitudinal forward direction over a soil layer, having a soil surface, to be worked by the assembly, said assembly including:

a digging shank to extend downwardly into the soil layer;

a digging point having a lower most extremity and to be fixed to a lower portion of the shank, the point having a leading face transverse of said direction and inclined to said direction by 20 to 40° so as to be downwardly inclined in said direction, and having a transverse width of 40 to 60 mm at said leading face;

a seed bed forming tool supported so as to be behind said point, and to be located to form a seed bed at a location higher than said lower most extremity;

a seed delivery tube to deliver a seed to the bed formed by said tool; and a press member to engage soil behind said tube to aid in ensuring seed delivered to said bed is covered by soil.

Preferably, said assembly further includes a fertilizer deliver tool to deliver fertilizer to behind said digging blade and forward of said tool so that the soil engaged by said tool to form said bed aids in covering the fertilizer.

Preferably, said assembly is configured so that said seed bed is 30 to 70 mm below said soil surface.

Preferably, said bed is located approximately 40 to 50 mm below said soil surface.

Preferably, said tool has a transverse width of 30 to 80 mm.

Preferably, said tool has a transverse width of about 50 mm.

Preferably, said leading face is inclined by about 30°.

Preferably, said digging blade has a transverse width of about 50 mm at said leading face.

Preferably, said press member is a wheel.

Preferably, said press member has a transverse width of 50 to 90 mm.

Preferably, said digging point has longitudinally extending side surfaces that are each inclined between 0 and 25° to said direction.

Preferably, said assembly includes a digging tool adapter attaching the digging point to the lower end extremity of said shank.

Preferably, said digging adapter has a leading surface inclined to the vertical by 15 to 30° so as to be upwardly rearwardly inclined.

Preferably, the adapter leading surface is inclined by about 20°.

DETAILED DESCRIPTION OF THE PREFERRED EMBODIMENT

Figure 1:
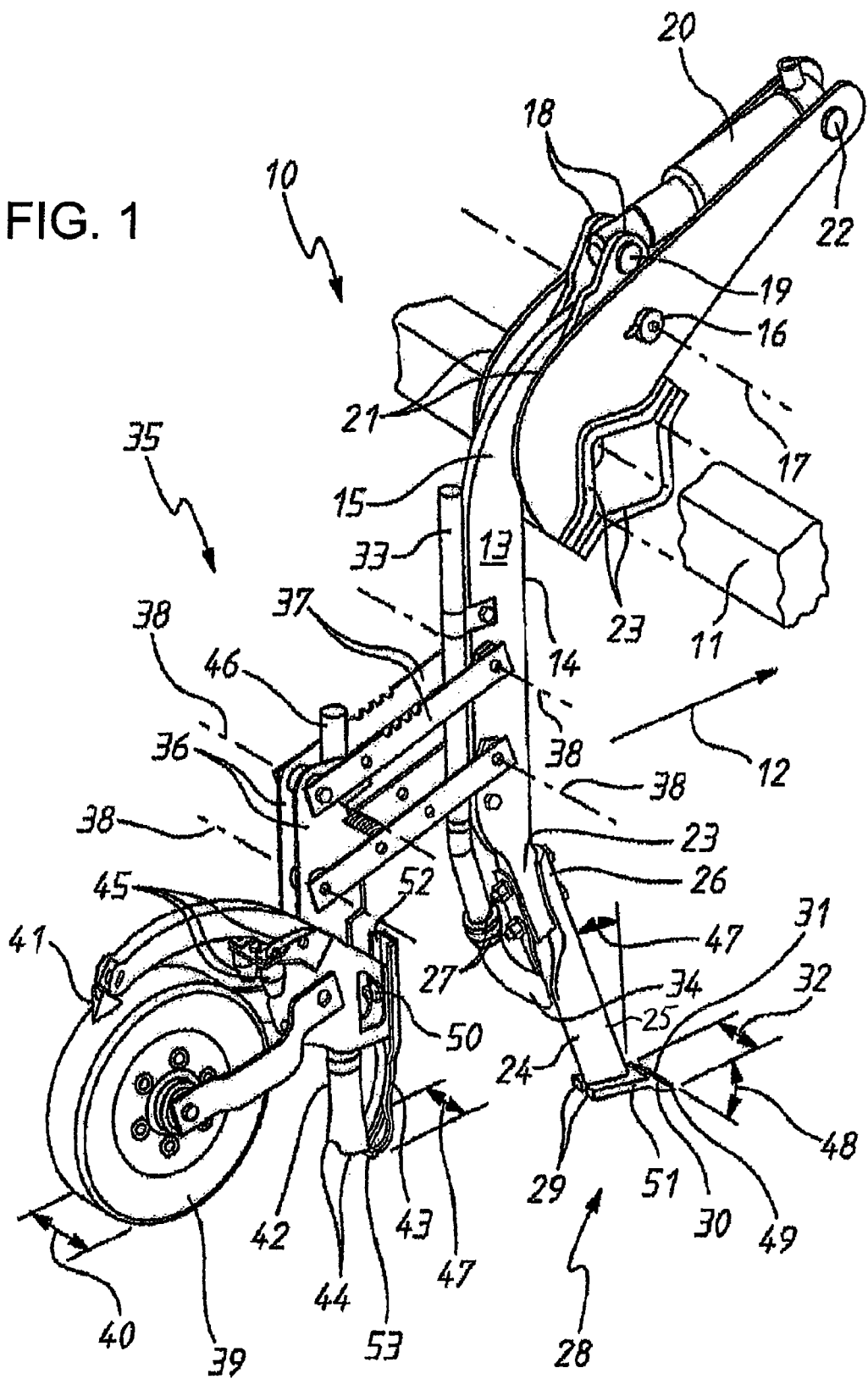
FIG. 1 depicts one embodiment of a plough assembly according to the invention in isometric view.
Figure 2:
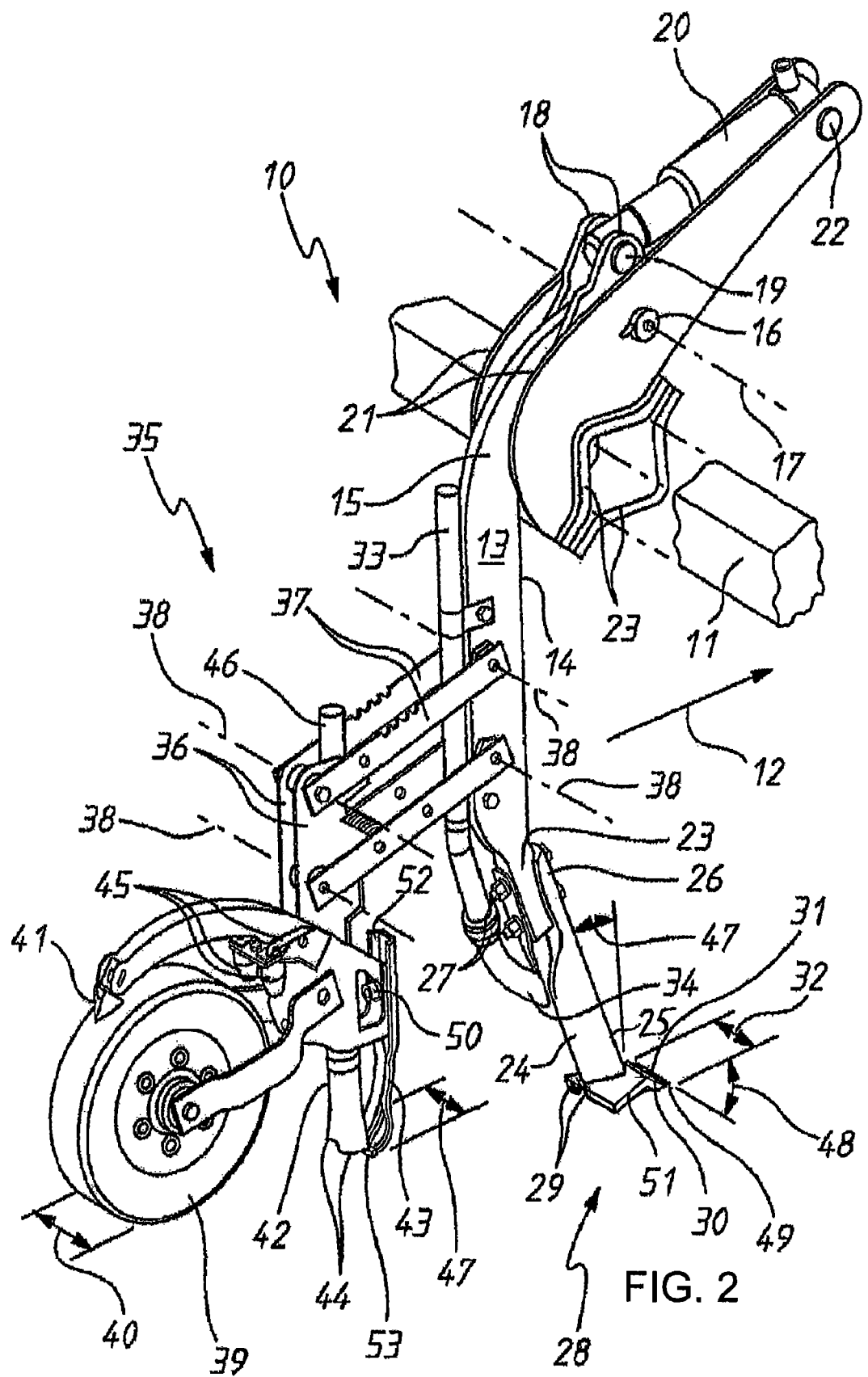
FIG. 2 depicts another embodiment of a plough assembly according to the invention in isometric view, with a digging blade having sides that rearwardy diverge.

In the accompanying drawings there is schematically depicted a plough assembly 10. The assembly 10 is to be fixed to a plough frame including a transverse beam 11. Typically the frame would be towed by a prime mover (tractor) in a forward direction 12 over a soil layer having an upper surface. Usually a large number of the assemblies 10 are attached to the plough frame that work the soil by being pulled through the soil by the prime mover.

The assembly 10 includes a plough shank 13 having a leading surface 14 that in this embodiment is generally upwardly oriented.

The shank 13 has a curved upper end 15 through which a transverse pin 16 passes to provide for pivoting movement of the shank 11 about a generally transverse horizontal axis 17. Fixed to the upper portion 15 are two brackets 18 to which there is pivotally attached by means of a pivot pin 19 a hydraulic ram 20. The ram 20 extends between a pair of mounting plates 21, and is attached thereto by means of pivot pin 22. The plates 21 are fixed to the beam 11 by clamp plates 23. Hydraulic fluid under pressure is delivered to the ram 20 to urge the shank 13 to the orientation depicted. However when an obstacle is encountered, the shank 13 is allowed to pivot rearwardly about the axis 17 to overcome the obstacle.

Attached to the lower end 23 of the shank 13 is a digging adapter 24. The adapter 24 has a leading surface 25 that is inclined to the vertical by an angle 47 of 15 to 30°, preferably 20°. The leading surface 25 is preferably provided by a tungsten strip. The adapter 24 has an upper socket 26 through which bolts 27 pass to secure the adapter 24 to the shank 13.

Secured to the lower end of the adapter 24 is a digging blade 28. The blade 28 includes a mounting portion consisting of a pair of rearwardly extending fingers 29 that provide a forwardly tapering cavity within which the lower extremity of the adapter 24 is wedged so that the digging blade 28 is securely fixed to the adapter 24. The fingers 29 are preferably inclined by about 5° to the horizontal so as to extend upwardly rearward. The blade 28 has a lower most extremity 49.

The digging blade 28 has a forward digging part 30 that has a generally planar leading face 31 that again is provided by a tungsten strip. The surface 31 is inclined by angle 48 of 20 to 40°, preferably 30° to the horizontal. Preferably the part 30 has at the face 31 a transverse width 32 of 40 to 60 mm, preferably about 50 mm.

In the above described preferred embodiment, the longitudinal sides 51 of the digging blade 28 are generally parallel. However the sides 51 may rearwardly diverge, each having an angle of 0 to 25° relative to the direction 12.

Immediately behind the shank 13 and adapter 24 is a fertilizer delivery tube 33. The delivery tube 33 has a lower extremity 34 that delivers fertilizer to a cavity in the soil layer provided by the adapter 24. Fertilizer exiting the tube 33 falls to approximately the depth of the blade 28.

Mounted on the shank 13 is a seeding assembly 35. The assembly 35 includes a pair of base plates 36 that are pivotally attached to the shank 13 by means of pairs of linkages 37 that act in a parallelogram manner so that the base plates 36 is maintained in the generally upright orientation illustrated. The linkages 37 are pivotally attached to the base plate 36 and shank 13 for pivoting movement about generally horizontal parallel transverse axes 38.

Attached to the base plates 36 is a press wheel 39 that has a transverse width 40 of 50 to 90 mm. The wheel 39 has a horizontal transverse axis of rotation.

Positioned about the press wheel 39 is a "scraper" 41 to aid in removing material that adheres to the press wheel 39.

Mounted between the base plates 38 is a seed delivery tube 42 and a bed forming tool 43. The tube 42 is bifurcated so as to have two outlets 44 that are transversely spaced relative to the direction 12. The tube 42 receives seed from a delivery system including delivery lines 46.

The tool 43 has a lower extremity with a transverse width 47, the width 47 being 50 to 70 mm, preferably 60 mm. Preferably the assembly 35 is configured so that the lower extremity 53 of the tool 43 is at a soil depth of 30 to 70 mm, preferably 40 to 50 mm, therefore forming a bed at that depth upon which seed is delivered through the tube 42. This depth is set by the wheel 39 engaging the surface of the soil layer as the wheel 39 is fixed to the plates 36. The outlets 44 are immediately behind the tool 43. The tool 43 is height adjustably attached to the base plates 36 by means of an aperture plate 52 and bolt 50.

In the above described embodiment, the digging blade 28, fertilizer delivery tube 34, tool 43, outlets 44 and press wheel 39 are aligned in the direction 12.

In operation of the above described assembly 10, the digging blade 28 operates at a greater depth than the tool 43 so that the tool 43 follows the digging blade 28 and forms a seed bed from the soil worked by the digging blade 28. The tool 43 also covers the fertilizer delivered behind the digging blade 28, forming the bed upon which seed is delivered. The seed is then covered by soil moved by the press wheel 39.

In a modification of the above described preferred embodiment, a further fertilizer delivery system includes nozzles and tubes 45. This would be a liquid fertilizer delivered to a position adjacent or above the seeds deposited on the seed bed.

The above described preferred embodiment has a number of advantages, in particular accurate seed location in an area of cultivated sub soil coupled with minimal top soil disturbance. Further advantages flow from this including better water infiltration, soil structure and quality, leading to increased yields. Still further the above described preferred embodiment enhances water harvesting, water storage and therefore minimises water wastage.

The invention claimed is:

1. A deep tillage plough assembly to be mounted on a beam to be moved in a longitudinal forward direction over a soil layer, having a soil surface, to be worked by the assembly, said assembly including:
   a digging shank to extend downwardly into the soil layer;
   a digging point having a lower most extremity and to be fixed to a lower portion of the shank, the point having a leading face transverse of said direction and inclined to said direction by 20 to 40° so as to be downwardly inclined in said direction, and having a transverse width of 40 to 60 mm at said leading face;
   a seed bed forming tool supported so as to be behind said point, and to be located to form a seed bed at a soil depth of 30 to 70 mm so as to form the seed bed at a location higher than said lower most extremity;
   a seed delivery tube to deliver a seed to the bed formed by said seed bed forming tool; and
   a press member to engage soil behind said tube to aid in ensuring seed delivered to said bed is covered by soil.

2. The assembly of claim 1, wherein said assembly further includes a fertilizer delivery tool to deliver fertilizer to behind said digging blade and forward of said tool so that the soil engaged by said tool to form said bed aids in covering the fertilizer.

3. The assembly of claim 1, wherein said seed bed forming tool is supported to locate said bed at approximately 40 to 50 mm below said soil surface.

4. The assembly of claim 1, wherein said seed bed forming tool has a transverse width of 30 to 80 mm.

5. The assembly of claim 4, wherein said seed bed forming tool has a transverse width of about 50 mm.

6. The assembly of claim 4, wherein said leading face is inclined by about 30°.

7. The assembly of claim 6, wherein said digging point has a transverse width of about 50 mm at said leading face.

8. The assembly of claim 7, wherein said press member is a wheel.

9. The assembly of claim 8, wherein said press member has a transverse width of 50 to 90 mm.

10. The assembly of claim 9, wherein said digging point has longitudinally extending side surfaces that are each inclined between 0 and 25° to said direction.

11. The assembly of claim 9, wherein said assembly includes a digging tool adapter attaching the digging point to the lower end extremity of said shank.

12. The assembly of claim 11, wherein said digging adapter has a leading surface inclined to the vertical by 15 to 30° so as to be upwardly rearwardly inclined.

13. The assembly of claim 12, wherein the adapter leading surface is inclined by about 20°.

14. The assembly of claim 1, wherein said leading face is inclined by about 30°.

15. The assembly of claim 1, wherein said digging point has a transverse width of about 50 mm at said leading face.

16. The assembly of claim 1, wherein said digging point has longitudinally extending side surfaces that are each inclined between 0 and 25° to said direction.

17. The assembly of claim 1, wherein said assembly includes a digging tool adapter attaching the digging point to the lower end extremity of said shank.

18. The assembly of claim 17, wherein said digging adapter has a leading surface inclined to the vertical by 15 to 30° so as to be upwardly rearwardly inclined.

19. The assembly of claim 18, wherein the adapter leading surface is inclined by about 20°.

20. A deep tillage plough assembly to be mounted on a beam to be moved in a longitudinal forward direction over a soil layer, having a soil surface, to be worked by the assembly, said assembly including:
   a digging shank having a lower end configured to extend downwardly toward the soil layer;

a digging adapter configured to extend into the soil layer and the digging adapter coupled to the lower end of the digging shank with a lower portion of the digging adapter coupled to a forward digging part, the forward digging part having a leading face transverse to said forward direction and inclined to said direction by 20 to 40° so as to be downwardly inclined in said direction, the forward digging part having a transverse width of 40 to 60 mm at said leading face and having sides that rearwardly diverge;

a seed bed forming tool supported so as to be behind said forward digging part, and to be located to form a seed bed at a soil depth of 30 to 70 mm so as to form the seed bed at a location higher than said lower most extremity;

a seed delivery tube to deliver a seed to the bed formed by said seed bed forming tool; and a press member to engage soil behind said tube to aid in ensuring seed delivered to said bed is covered by soil.

21. The assembly of claim 20, wherein said assembly further includes a fertilizer delivery tool to deliver fertilizer to behind said digging shank and forward of said seed bed forming tool so that the soil engaged by said seed bed forming tool to form said bed aids in covering the fertilizer.

22. The assembly of claim 20, wherein the sides of the forward digging point each diverge from the forward direction at an angle of up to 25°.

23. The assembly of claim 22, wherein said seed bed forming tool is supported to locate said bed at approximately 40 to 50 mm below said soil surface.

24. The assembly of claim 22, wherein said seed bed forming tool has a transverse width of 30 to 80 mm.

25. The assembly of claim 24, wherein said seed bed forming tool has a transverse width of about 50 mm.

26. The assembly of claim 24, wherein said leading face is inclined by about 30°.

27. The assembly of claim 24, wherein the digging adapter has a tungsten strip on a leading surface thereof and the leading face of the forward digging part is equipped with a tungsten strip.

* * * * *